United States Patent
Kanamaru (10) Patent No.: US 7,774,730 B2
(45) Date of Patent: Aug. 10, 2010

(54) METHOD OF AND SYSTEM FOR DESIGNING SEMICONDUCTOR INTEGRATED CIRCUIT

(75) Inventor: Keisuke Kanamaru, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 11/846,948

(22) Filed: Aug. 29, 2007

(65) Prior Publication Data

US 2008/0059938 A1    Mar. 6, 2008

(30) Foreign Application Priority Data

Sep. 5, 2006    (JP)    ............................. 2006-240361

(51) Int. Cl.
G06F 17/50    (2006.01)
(52) U.S. Cl. .................... 716/6; 716/1; 716/4
(58) Field of Classification Search ............ 716/1, 716/6, 18, 4
See application file for complete search history.

(56) References Cited

U.S. PATENT DOCUMENTS

| | | | |
|---|---|---|---|
| 5,980,092 A * | 11/1999 | Merryman et al. ............. 716/6 |
| 6,457,167 B1 * | 9/2002 | Kitahara ...................... 716/18 |
| 6,836,877 B1 * | 12/2004 | Dupenloup ................... 716/18 |
| 2004/0268279 A1 * | 12/2004 | Oleksinski et al. ............. 716/6 |
| 2006/0123370 A1 * | 6/2006 | Vergara-Escobar ............. 716/6 |
| 2007/0011643 A1 * | 1/2007 | Wang et al. ................... 716/18 |
| 2008/0098271 A1 * | 4/2008 | Muller-Brahms ........... 714/738 |
| 2009/0132984 A1 * | 5/2009 | Chander et al. ................ 716/6 |
| 2009/0172612 A1 * | 7/2009 | Kanamaru .................... 716/4 |
| 2009/0254874 A1 * | 10/2009 | Bose ............................. 716/6 |

FOREIGN PATENT DOCUMENTS

| | | |
|---|---|---|
| JP | 11-149496 A | 6/1999 |
| JP | 2002-190528 A | 7/2002 |
| JP | 2004-171149 A | 6/2004 |

* cited by examiner

*Primary Examiner*—Jack Chiang
*Assistant Examiner*—Suchin Parihar
(74) *Attorney, Agent, or Firm*—Sughrue Mion, PLLC (57) ABSTRACT

A method of designing a semiconductor integrated circuit by a computer, comprises: (A) reading an RTL data indicating RTL description of the semiconductor integrated circuit; and (B) providing a gating cell for clock gating during logic synthesis of the RTL description. The gating cell includes a latch circuit that latches an enable signal, which activates a target of the clock gating, in synchronization with a clock signal. The gating cell is provided separately from a timing exception path.

7 Claims, 12 Drawing Sheets

1: LSI DESIGN SYSTEM

```
module test (clk, data, out, a, en1, en2, en3, mul, s1, s2);
input clk, data;
input en1, en2, en3, a, mul;
input s1, s2;

output out;

wire en4;
reg FF;

assign en4=mul & a;

always@(posedge clk)
  if(en1)
    ;
  else
    if(en2)
      FF<=s1|s2;
    else
      if(en3)
        if(en4)
          FF<=data;

assign out=FF;

endmodule
```

Fig. 6

```
set_multicycle_path 3 _from[get_ports mul]
```

```
MAIN PROCESSING
 foreach ff   (obtain all FF) {                                          STEP A1
   foreach cell  (obtain all fan-in cell of [ff]) {                      STEP A2
     trace(cell); # call subroutine [trace]                              STEP A3
   }
 }
  exit;

sub trace(cell)   {# definition of subroutine [trace]
   if( [cell] is selector  ) {                                           STEP A4
     trace select signal of [cell] until FF or external port
     and store its source in [end_points_list] ;                         STEP A5 if there is any one point specified as
     timing-exception in [end_points_list], then return ;                STEP A6 mark [cell] as target selector                                      STEP A7 foreach x (all fan-in cell of [cell] other than select signal) {    STEP A8
       trace(x); recursively call subroutine [trace] by using [x] as argument STEP A9
     }
   }else{
    return 0; # if [cell] is not selector, then return ;                 STEP A10
     }
 }
```

METHOD OF AND SYSTEM FOR DESIGNING SEMICONDUCTOR INTEGRATED CIRCUIT

BACKGROUND OF THE INVENTION

1. Field of the Invention

The present invention relates to a technique for designing a semiconductor integrated circuit. In particular, the present invention relates to a technique for designing a semiconductor integrated circuit based on a clock gating method.

2. Description of Related Art

An LSI has to meet "timing constraint" in order for the LSI to operate normally at a desired clock frequency. The timing constraint includes so-called "hold constraint" and "setup constraint". For example, let us consider a case where a signal output from a first flip-flop is input to a second flip-flop. In this case, the timing at which the signal arrives at the second flip-flop is required to be after an input of the current clock and before an input of the next clock. Constraint relating to the former is the hold constraint, while constraint relating to the latter is the setup constraint.

In designing an LSI, it is necessary to design and optimize timing such that the above-mentioned timing constraint is met. Therefore, a timing analysis is important. In the timing analysis, circuit delays are estimated and whether or not each signal on each path meets the timing constraint is verified. However, the paths within the design target circuit include some paths that need not meet the usual timing constraint. Such a path is referred to as a "timing exception path". The timing exception path includes a "false path" and a "multi-cycle path".

The false path is a path through which a signal does not propagate logically. For example, in a case where one input of an AND gate is fixed to the logical value "0" in an actual operation of the LSI, a change in another input of the AND gate does not propagate to the subsequent stage. Therefore, an output path of the AND gate is the false path. Such false paths can be ignored in the timing analysis.

The multi-cycle path is a path through which a signal is allowed to take two or more clock cycles to propagate (refer to Japanese Laid Open Patent Application JP-P2004-171149A). For example, in a case where the LSI normally operates even when a signal takes 3 clock cycles to propagate through a certain path, the certain path is referred to as a "multi-cycle path of 3 cycles". It is usually necessary to set a delay in a path of a combinational circuit section within one clock cycle. As for a multi-cycle path of n cycles (n is an integer not less than 2), however, it is possible to ease (relax) the timing constraint to be n clock cycles.

In recent years, the timing constraint has become more severe with speeding up and increasing miniaturization of the LSI. This leads to increase in time required for the timing designing, namely, time required for the LSI designing. If one can utilize information on the above-mentioned timing exception in the timing designing, the timing constraint is eased and thus unnecessary timing optimization processing can be omitted. For that purpose, it is preferable to give constraint for the timing exception path (hereinafter referred to as "timing exception constraint") in addition to the usual timing constraint with regard to usual paths. When the timing exception constraint is given, the timing constraint is eased as a whole. To consider the timing-exception is important from a viewpoint of promoting the efficiency of the LSI designing.

Also, a technique called "clock gating", which contributes to reduction of electric power consumption, is known in the technical field of the LSI (refer to Japanese Laid Open Patent Application JP-A-Heisei, 11-149496 and Japanese Laid Open Patent Application JP-P2002-190528A, for example). According to the clock gating, clock supply to a circuit which operates based on the clock is cut off in a period during which the circuit needs not operate. For example, clock supply to a register is cut off in a period during which a value of the register needs not be rewritten. Consequently, signal transition is stopped during that period and hence the electric power consumption is reduced.

Figure 1:
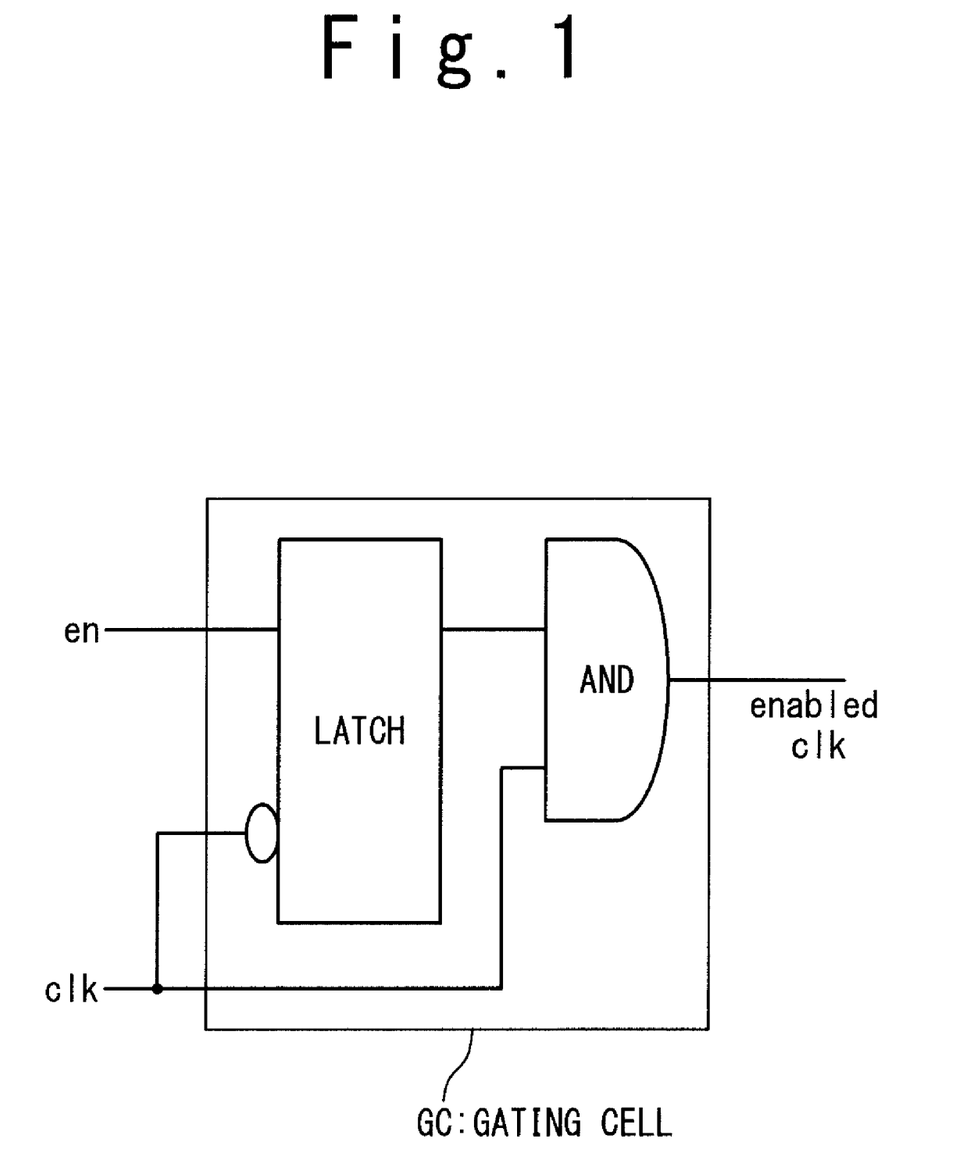
FIG. 1 is a block diagram showing a configuration of a gating cell used in clock gating.

In order to achieve the clock gating, a "gating cell" is usually employed. FIG. 1 shows a configuration of a gating cell GC which is well-known to the public (for example, see FIG. 6 in the Japanese Laid Open Patent Application JP-P2002-190528A). The gating cell GC shown in FIG. 1 is provided with an AND gate and a latch circuit. The latch circuit latches an enable signal en in synchronization with a clock signal clk. An output of the latch circuit and the clock signal clk are input to the AND gate. The enable signal en is a signal for activating a target circuit (a flip-flop or the like) that is a target of the clock gating, and is generated by an enable logic.

Such a gating cell GC is provided on a clock line in the clock gating processing. An output of the AND gate is connected to the above-mentioned target circuit, and thus the supply of the clock signal clk to the target circuit is controlled by the gating cell GC. When the enable signal en is activated, the gating cell GC supplies the clock signal clk to the target circuit. On the other hand, when the enable signal en is deactivated, the gating cell GC cuts off the supply of the clock signal clk to the target circuit. As a result, the target circuit is deactivated and the electric power consumption is reduced.

It should be noted that the clock gating can be also realized by using only an AND logic between the enable signal en and the clock signal clk. The reason why the gating cell GC shown in FIG. 1 is provided with the latch circuit is as follows. If the enable signal en is unstable, it causes such a problem as a plurality of clock pulses (glitch) are generated when the necessary number of clock pulses should be one. In order to avoid such the problem, the latch circuit is added to the gating cell GC. The latch circuit captures a status of the enable signal en and holds the status until a clock pulse is generated completely. As a result, the output of the AND gate is stabilized. Such the gating cell GC provided with the latch circuit is referred to as a "latch-based gating cell".

The gating cell is automatically inserted by a logic synthesis tool at a time of a logic synthesis. At the time of the logic synthesis, the above-mentioned timing analysis is executed. Here, let us consider a case where the gating cell GC (latch-based gating cell) shown in FIG. 1 is used. In this case, the timing analysis is also performed with respect to the gating cell GC, because the latch circuit is a sequential circuit that operates based on the clock signal clk. In a case when the enable signal en is a signal of the timing exception path, to additionally give the "timing exception constraint" for the gating cell GC may be preferable from a standpoint of easing the timing constraint.

However, the timing exception constraint is basically supposed to be given only for a register and a flip-flop, and the operation of giving the timing exception constraint for the gating cell GC as well is cumbersome and complicated. The reason is that the gating cell GC is automatically generated by the logic synthesis tool during the logic synthesis, when the timing analysis is executed. In order to give the timing exception constraint for the gating cell GC in advance of the logic synthesis, it is necessary to predict a name (instance name) that is given to the gating cell GC. However, the prediction is obviously difficult.

As described above, the operation of giving the timing exception constraint for the gating cell GC is difficult and complicated for a circuit designer. This cancels the effect due to the easing (relaxation) of the timing constraint, which eventually results in deterioration of the efficiency of circuit designing.

SUMMARY

In an exemplary aspect of the invention, a method of designing a semiconductor integrated circuit by a computer is provided. The method includes: (A) reading an RTL data indicating RTL description of the semiconductor integrated circuit; and (B) providing a gating cell for clock gating during logic synthesis of the RTL description. The gating cell includes a latch circuit that latches an enable signal in synchronization with a clock signal. The enable signal is for activating a target of the clock gating. In the (B) step, the gating cell is provided separately from a timing exception path.

In this manner, the gating cell is provided not to be connected to the timing exception path in the logic synthesis. Therefore, it is not necessary to give the timing exception constraint for the gating cell. It is just enough to give the timing exception constraint only for a register and a flip-flop. According to the invention, the above-mentioned complicated operation of giving the timing exception constraint for the gating cell can be omitted. As a result, the efficiency of circuit designing is improved, and thus the time required for designing the semiconductor integrated circuit is reduced.

In another exemplary aspect of the invention, a design program recorded on a computer-readable medium is provided. When executed, the design program causes a computer to perform a method including: (A) reading an RTL data indicating RTL description of a semiconductor integrated circuit; and (B) providing a gating cell for clock gating during logic synthesis of the RTL description. The gating cell includes a latch circuit that latches an enable signal, which activates a target of the clock gating, in synchronization with a clock signal. The gating cell is provided separately from a timing exception path.

In still another exemplary aspect of the invention, a system for designing a semiconductor integrated circuit is provided. The system comprises: a memory device in which an RTL data indicating RTL description of the semiconductor integrated circuit is stored; and a data processor configured to read the RTL data from the memory device and to perform logic synthesis of the RTL description. In the logic synthesis, the data processor provides a gating cell for clock gating. The gating cell includes a latch circuit to which an enable signal and a clock signal are input. The data processor provides the gating cell separately from a timing exception path.

According to the present invention, in the designing based on the clock gating method, the complicated operation of giving the timing exception constraint for the gating cell can be omitted. As a result, the efficiency of the designing is improved, and thus the time required for designing the semiconductor integrated circuit is reduced.

EXEMPLARY EMBODIMENTS

A method of and a system for designing a semiconductor integrated circuit according to exemplary embodiments of the present invention will be described below with reference to the attached drawings.

1. Configuration

Figure 2:
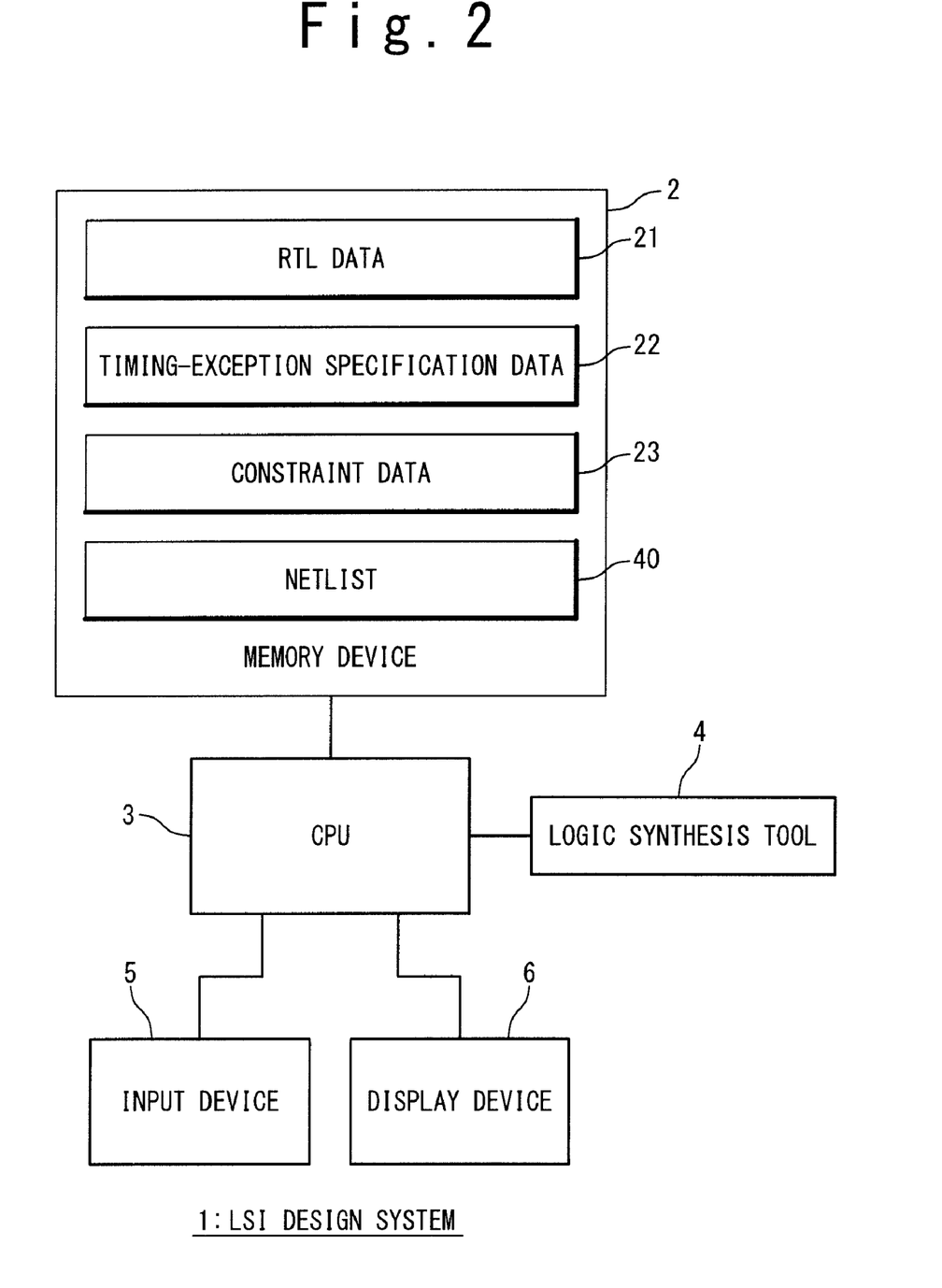
FIG. 2 is a block diagram showing a configuration of an LSI design system according to an exemplary embodiment of the present invention.

FIG. 2 is a block diagram showing a configuration of an LSI design system 1 according to an exemplary embodiment of the present invention. The LSI design system 1 is a computer system for designing a semiconductor integrated circuit. The LSI design system 1 is provided with a memory device 2, a CPU 3, a logic synthesis tool 4, an input device 5 and a display device 6. The memory device 2 is exemplified by a RAM (Random Access Memory) and a hard disk drive. The CPU 3 is capable of accessing respective devices. The logic synthesis tool 4 is a software product that is executed by the CPU 3. The logic synthesis tool 4 may be recorded on a computer-readable medium. The CPU 3 performs a logic synthesis processing to be described later, by executing the logic synthesis tool 4. The input device 5 is exemplified by a keyboard and a mouse. With reference to information displayed on the display device 6, a circuit designer can input various commands and data by using the input device 5.

Stored in the memory device 2 are an RTL data 21, a timing-exception specification data 22, a constraint data 23 and a netlist 40.

The RTL data 21 indicates an RTL (Register Transfer Level) description of a design target LSI and represents a logic design of the LSI. The RTL data 21 is described in HDL (Hardware Description Language) such as Verilog, VHDL or the like.

The timing-exception specification data 22 is a data (setting command) that specifies the "timing-exception" in the design target LSI. The timing exception path such as the false path and the multi-cycle path can be specified as the timing-exception. Alternatively, a signal on the timing exception path (hereinafter referred to as a "timing exception signal") can be specified as the timing-exception. Alternatively, a source (e.g. an external port and so force) of the timing exception signal can be specified as the timing-exception. That is, the timing-exception includes at least one of the timing exception path, the timing exception signal and the source of the timing exception signal. The timing-exception specification data 22 is described, for example, in an SDC format proposed by the Synopsys Corporation (registered trademark).

The constraint data 23 is a data indicating various constraints to be considered in the logic synthesis processing. More specifically, the constraint data 23 includes the timing constraint, the timing exception constraint regarding the above-mentioned timing-exception, area constraint, design rule constraint and so on.

2. Logic Synthesis Processing

The LSI design system 1 shown in FIG. 2 performs the logic synthesis processing. An input to the logic synthesis processing is the RTL data 21, and its output is the netlist 40. In the logic synthesis processing, the RTL description is analyzed, a circuit corresponding to the logic design indicated by the RTL description is created, the circuit configuration is optimized, and consequently the netlist 40 corresponding to the RTL description is generated. In addition, according to the exemplary embodiment, the gating cell GC (see FIG. 1) for achieving the clock gating is automatically inserted during the logic synthesis processing.

Figure 3:
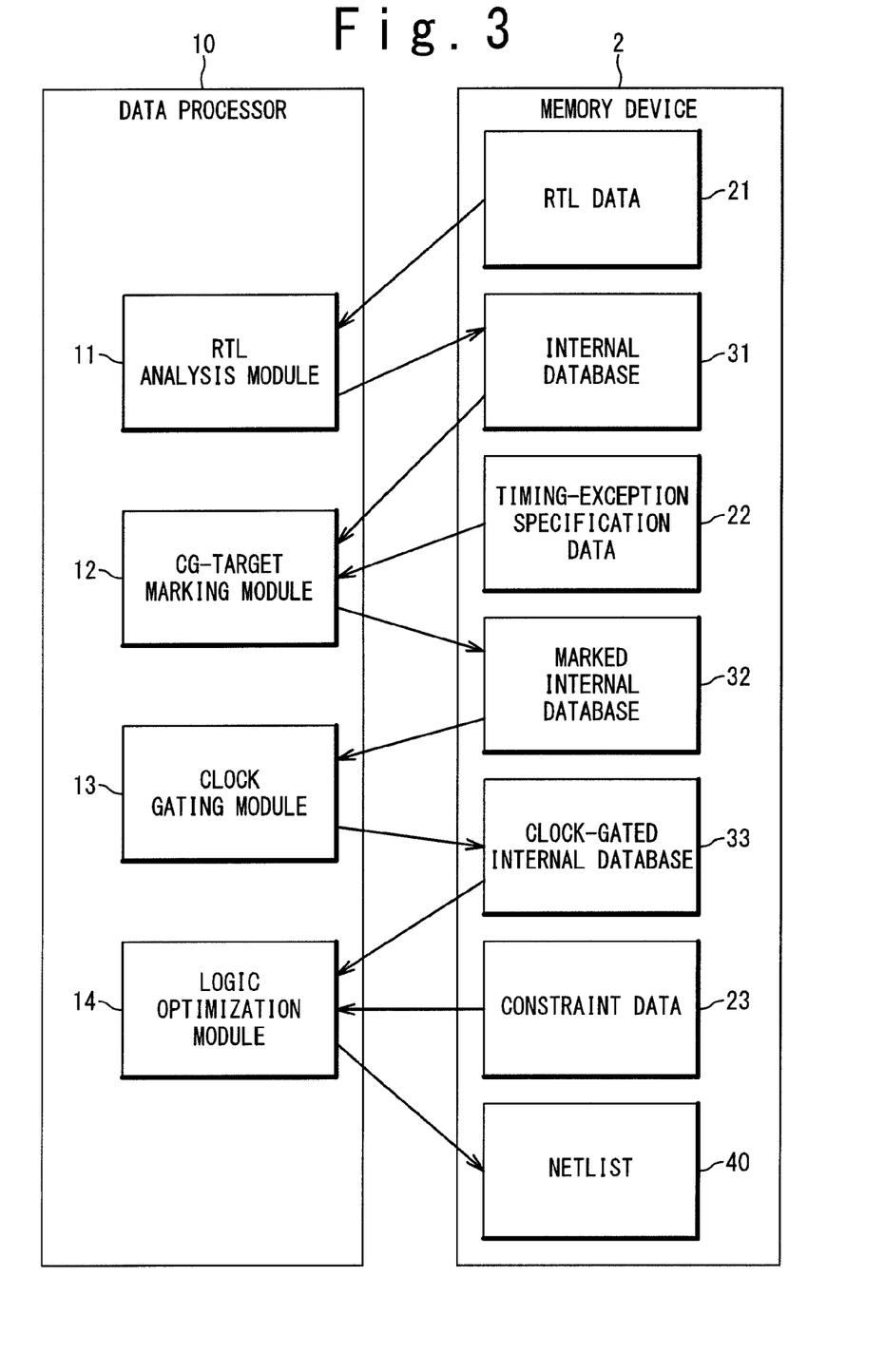
FIG. 3 is a block diagram showing a flow of a logic synthesis processing according to the exemplary embodiment of the present invention.

FIG. 3 conceptually shows the configuration of the LSI design system 1 in the logic synthesis processing and an overall flow of the logic synthesis processing. In FIG. 3, a data processor 10 is achieved by the collaboration of the CPU 3 and the logic synthesis tool 4. The data processor 10 executes the logic synthesis processing by exchanging data with the memory device 2. More specifically, the data processor 10 includes an RTL analysis module 11, a CG-target marking module 12, a clock gating module 13 and a logic optimization module 14.

Figure 4:
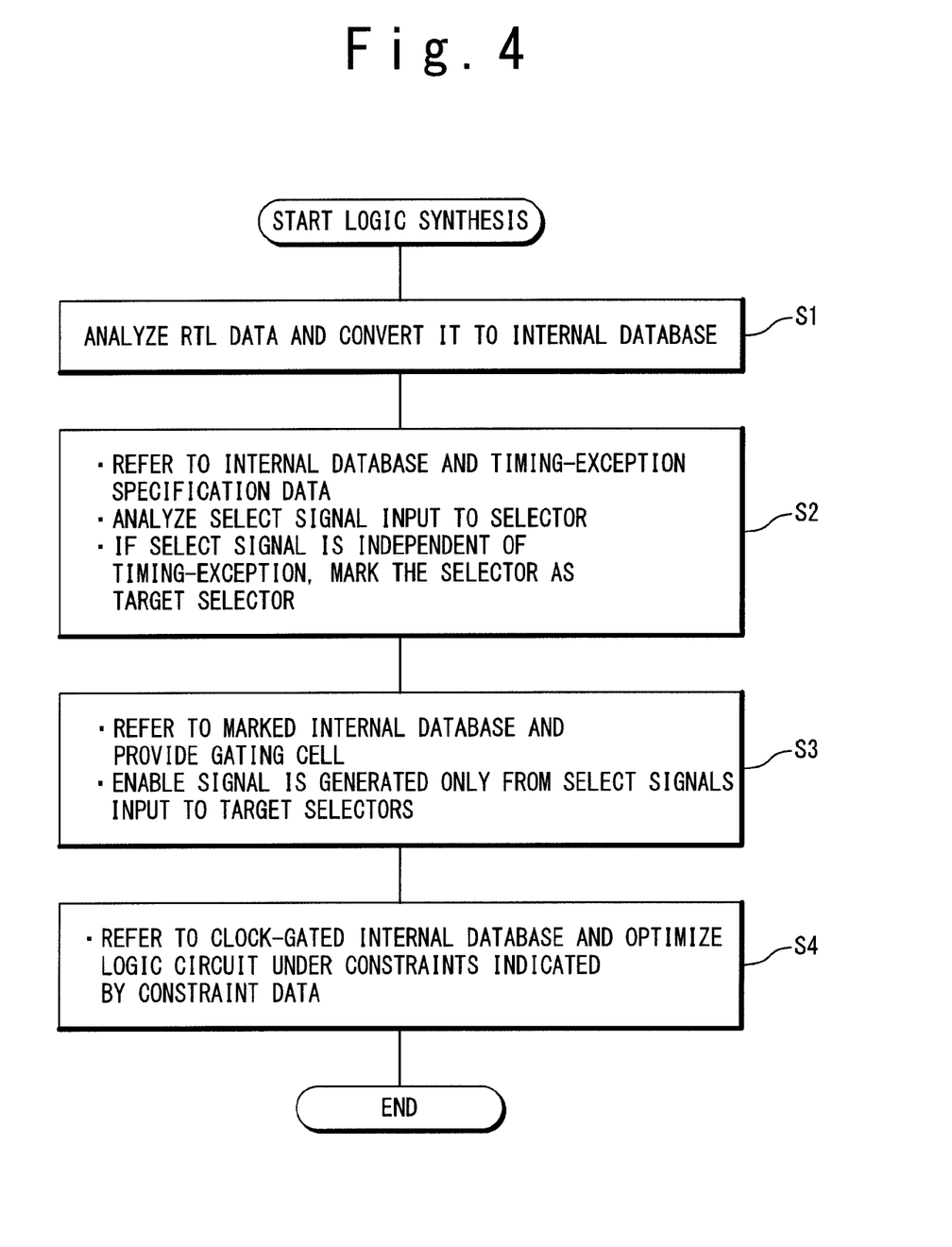
FIG. 4 is a flowchart showing the logic synthesis processing according to the exemplary embodiment of the present invention.

FIG. 4 is a flowchart showing the logic synthesis processing according to the present exemplary embodiment. An outline of the logic synthesis processing according to the present exemplary embodiment will be described below with reference to FIGS. 3 and 4.

Step S1:

The RTL analysis module 11 reads the RTL data 21 from the memory device 2 and analyzes the RTL description indicated by the RTL data 21. More specifically, the RTL analysis module 11 converts the RTL description into a logic circuit model that is logically equivalent to the RTL description. With regard to a method of the conversion, refer to "BooleDozer: Logic synthesis for ASICs, Written by A. J. Sulliavan, etc", for example. The logic circuit model generated by the conversion includes typical logic gate (AND gate, OR gate, inverter and the like), an enable logic, a flip-flop, a port, a net and so forth. An internal database 31 is a data indicating the generated logic circuit model and indicates a logical connection of the design circuit. The generated internal database 31 is stored in the memory device 2.

Step S2:

Next, the CG-target marking module 12 reads the internal database 31 and the timing-exception specification data 22 from the memory device 2. The CG-target marking module 12 refers to the logic circuit model indicated by the internal database 31, and analyzes the enable logic (write enable logic) which generates the enable signal en regarding the flip-flop. Here, the CG-target marking module 12 refers to the timing-exception indicated by the timing-exception specification data 22, and extracts a section in the enable logic that is independent of (not related to) the timing-exception. Then, the CG-target marking module 12 marks the extracted section as a target of the next process (Step S3).

More specifically, the enable logic in the logic circuit model includes a group of selectors. A select signal is input to each selector. The above-mentioned enable signal en is generated based on select signals input to the group of selectors. Therefore, the CG-target marking module 12 analyzes the select signals input to the group of selectors. If a select signal is dependent on (related to) the specified timing-exception, the CG-target marking module 12 excludes the selector receiving the select signal from the target of the next process. On the other hand, if a select signal is independent of (not related to) the specified timing-exception, the CG-target marking module 12 marks the selector receiving the select signal as the target of the next process. The marked selector is referred to as a "target selector".

In other words, in a case where a select signal is a timing exception signal, the CG-target marking module 12 does not set the selector receiving the timing exception signal as the target selector. On the other hand, in a case where a select signal is not a timing exception signal, the CG-target marking module 12 sets the selector receiving the select signal as the target selector. In this manner, the CG-target marking module 12 performs the marking of the target selectors with reference to the timing-exception specification data 22. The internal database that reflects the marking processing is a marked internal database 32, which is stored in the memory device 2.

Step S3:

Next, the clock gating module 13 reads the marked internal database 32 from the memory device 2. The clock gating module 13 inserts the gating cell GC (refer to FIG. 1) for the clock gating into the logic circuit model indicated by the marked internal database 32. The gating cell GC is provided between the write enable logic and the flip-flop. According to the present exemplary embodiment, the gating cell GC is provided separately from the timing exception path.

More specifically, in inserting the gating cell GC, the clock gating module 13 considers the marked target selector described above. The target selector is independent of the timing-exception. Therefore, the clock gating module 13 can provide the gating cell GC such that the enable signal en is generated from only the select signal input to the target selector. As a result, the gating cell GC is provided separately from the timing exception path. The internal database for which the insertion of the gating cell GC is completed is a clock-gated internal database 33, which is stored in the memory device 2.

Step S4:

Next, the logic optimization module 14 reads the clock-gated internal database 33 and the constraint data 23 from the memory device 2. The logic optimization module 14 optimizes the logic circuit model indicated by the clock-gated internal database 33, under the various constraints (the timing constraint, the timing exception constraint, the area constraint, the design rule constraint and the like) indicated by the constraint data 23. As a result, the netlist 40 indicating the circuit configuration corresponding to the RTL description is generated. With regard to the circuit configuration indicated by the netlist 40, it is ensured that the clock gating is performed except for the timing exception signal.

In the logic synthesis processing according to the exemplary embodiment, as described above, the gating cell GC is provided so as not to be connected to the timing exception path. Therefore, it is not necessary to give the timing exception constraint for the gating cell GC in advance. It is just enough to give the timing exception constraint only for a register and a flip-flop as usual. Thus, the complicated operation of giving the timing exception constraint for the gating cell GC can be omitted. As a result, the efficiency of circuit designing is improved, and thus the time required for the LSI designing is reduced.

3. One Example of Logic Synthesis Processing

Figure 5:
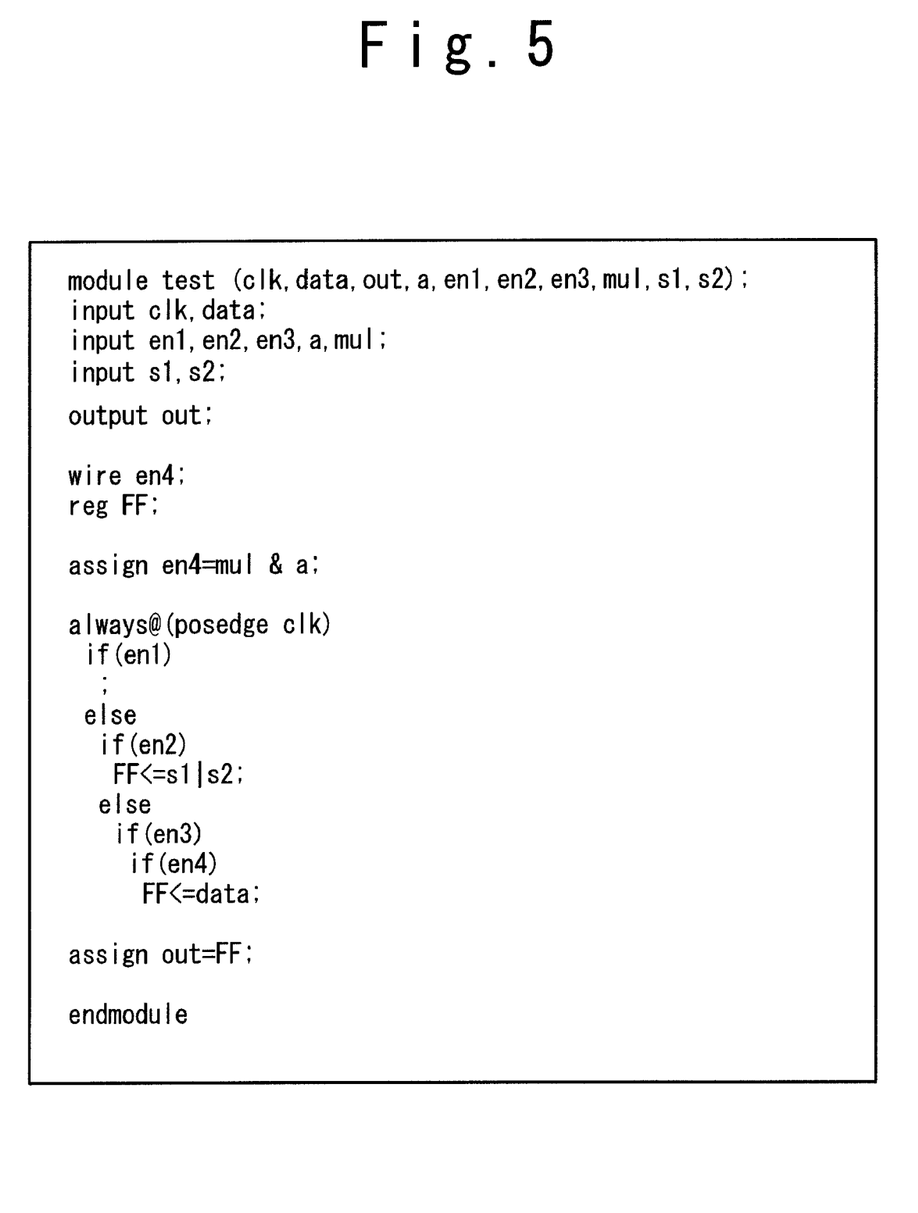
FIG. 5 is a diagram showing one example of an RTL data.
Figure 6:
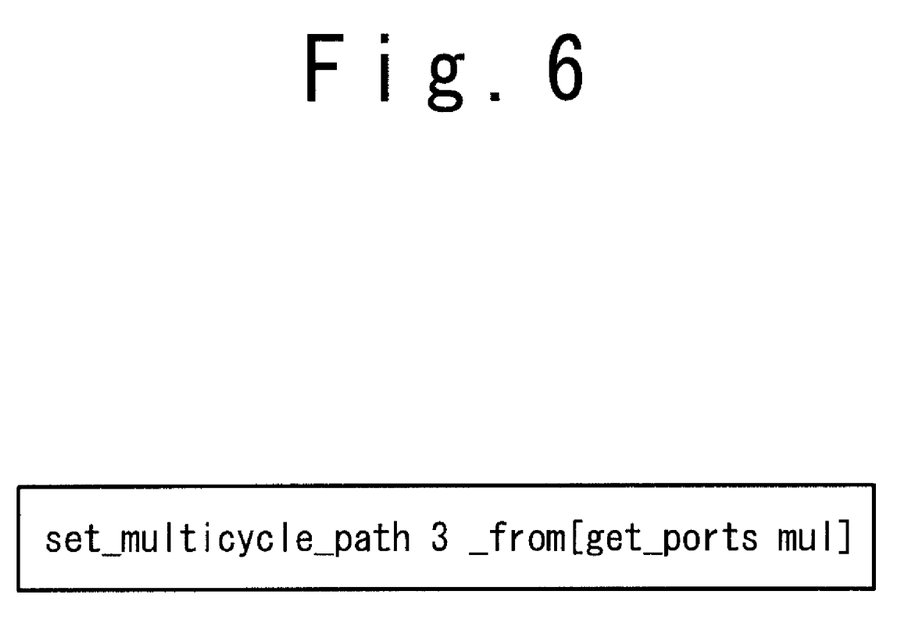
FIG. 6 is a diagram showing one example of a timing-exception specification data.

Next, the flow of the logic synthesis processing according to the exemplary embodiment will be explained with one concrete example. FIG. 5 shows one example of the RTL data 21 described in the Verilog. Also, FIG. 6 shows one example of the timing-exception specification data 22 described in the SDC format. As shown in FIG. 6, an external port "mul" is specified as the timing-exception, and a path from the external port "mul" is set as a multi-cycle path of 3 cycles. A signal supplied from the external port "mul" is hereinafter referred to as a timing exception signal "mul".

3-1. Steps S1

Figure 7:
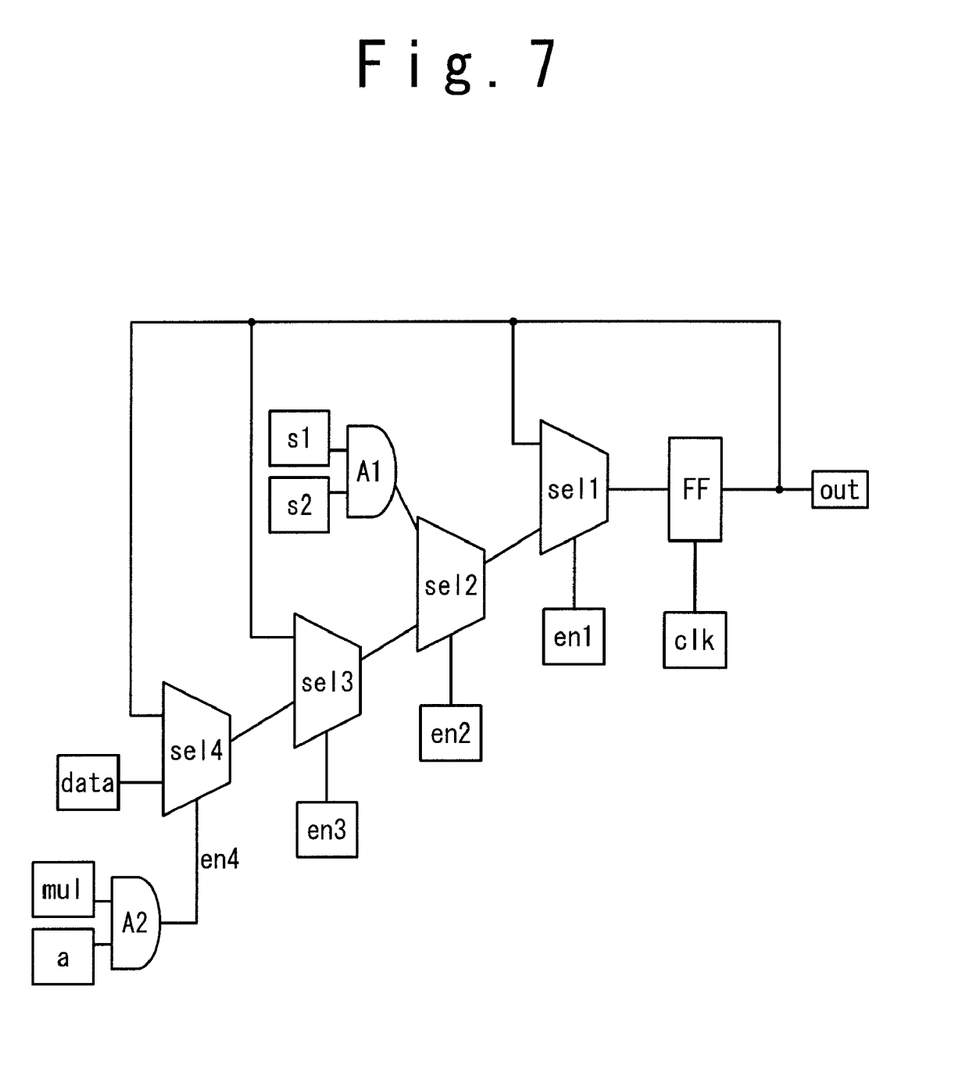
FIG. 7 is a conceptual diagram showing one example of an internal database that is logically equivalent to the RTL data.

The RTL analysis module 11 reads the RTL data 21 shown in FIG. 5 and generates the internal database 31 as shown in FIG. 7. The generated internal database 31 represents the logic circuit model that is logically equivalent to the RTL description.

As shown in FIG. 7, the logic circuit model includes a flip-flop FF, selectors sel1, sel2, sel3, sel4, AND gates A1, A2, input ports clk, data, en1, en2, en3, a, mul, s1, s2 and an output port out. An output of the flip-flop FF is connected to the output port out. The clock signal clk is input from the input port clk to the flip-flop FF. Also, an output of the enable logic is input to the flip-flop FF.

The enable logic in FIG. 7 consists of the selectors sel1, sel2, sel3, sel4, the AND gates A1 and A2. Inputs of the selectors (sel1, sel2, sel3 and sel4) are connected to the output of the flip-flop FF. Also, select signals (en1, en2 and en3) are input from the input ports (en1, en2 and en3) to the selectors (sel1, sel2 and sel3), respectively. For example, the selector sel1 is estimated from the description "if (en1)" shown in FIG. 5. If the select signal en1 is "1", the output of the flip-flop FF is fed back. If the select signal en1 is "0", logics after "else" are referred to. Moreover, an output of the AND gate A2 is input as a select signal en4 to the selector sel4. The select signal en4 is the logical AND of the signal "a" and the timing-exception signal "mul".

Figure 8:
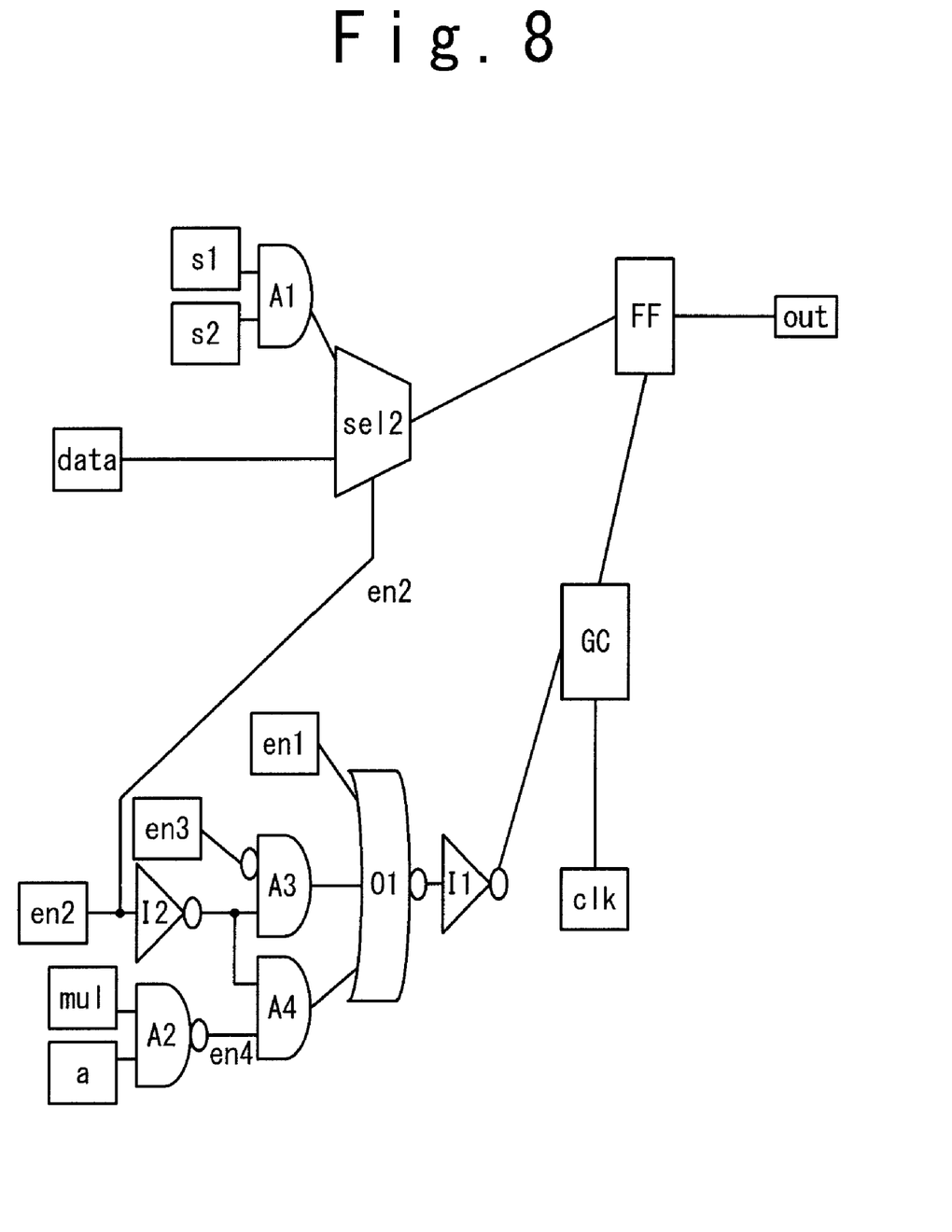
FIG. 8 is a conceptual diagram showing a clock-gated internal database in a case where a gating cell is inserted into the internal database shown in FIG. 7 in accordance with a usual method.

If the gating cell GC is inserted into the logic circuit model shown in FIG. 7 in accordance with a usual method, a configuration as shown in FIG. 8 is obtained. In FIG. 8, the gating cell GC is provided between the output of the enable logic and the flip-flop FF, and the enable signal and the clock signal clk are input to the gating cell GC. According to the usual method, the enable logic depends on all the select signals en1, en2, en3 and en4.

The problem here is that the select signal en4 depends on the timing exception signal "mul". In the case where the gating cell GC has the latch circuit as shown in FIG. 1, the gating cell GC also becomes a point that should serve as an end-point of the timing exception constraint. Therefore, when the timing exception signal "mul" is associated with the multi-cycle path of 3 cycles, the timing exception constraint of 3 cycles must be given for the gating cell GC as well. However, in order to give the timing exception constraint for the gating cell GC, it is necessary to predict an actual name (instance name) that is given to the gating cell GC in the logic synthesis. The prediction is difficult for a circuit designer. That is to say, the operation of giving the timing exception constraint for the gating cell GC is difficult and complicated, which causes deterioration of the efficiency of circuit designing.

According to the exemplary embodiment, the logic synthesis is carried out such that the timing exception constraint needs not be given for the gating cell GC. For that purpose, the following processing is executed prior to the insertion of the gating cell GC.

3-2. Step S2

Figure 9:
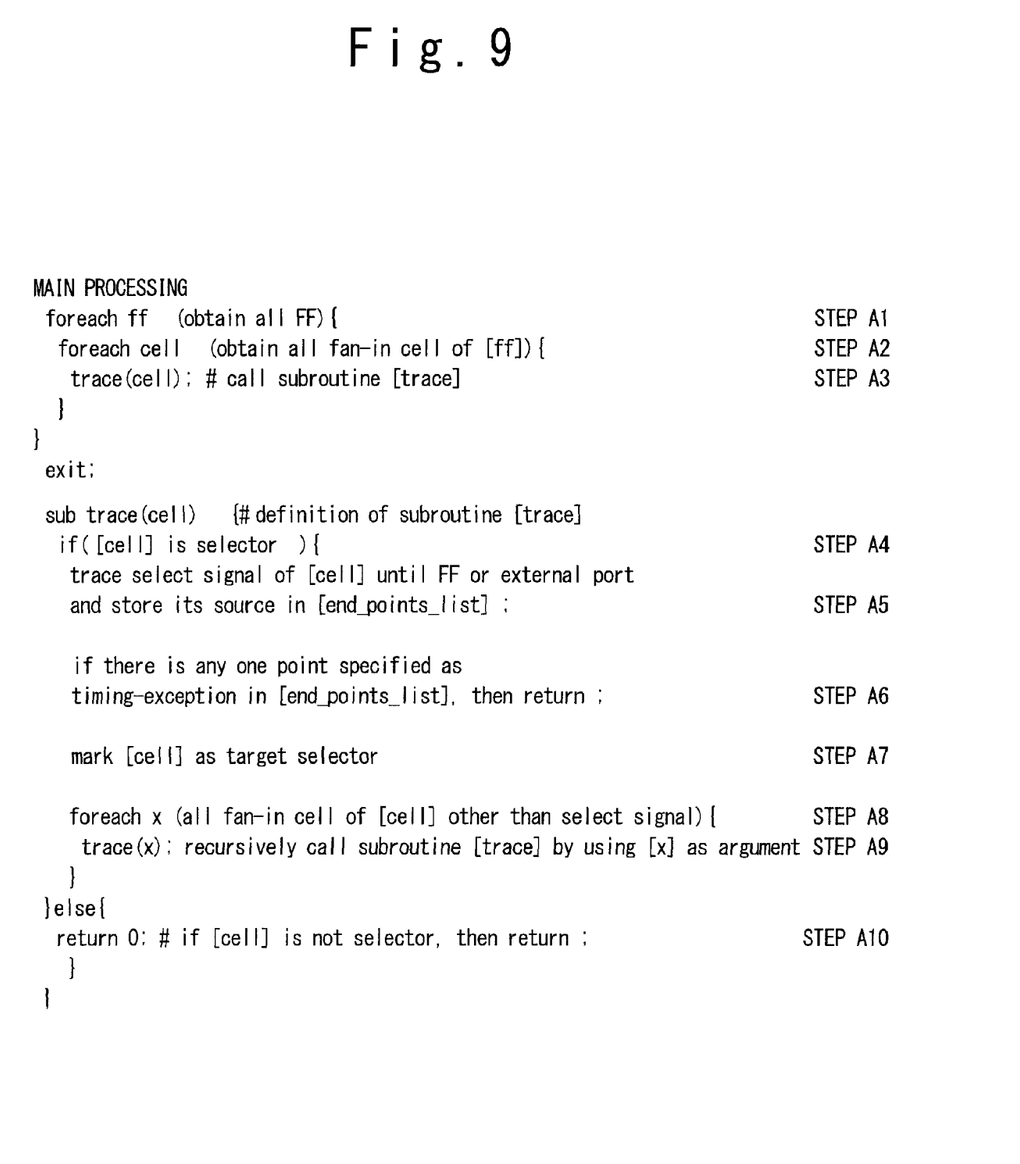
FIG. 9 is a conceptual diagram showing an algorism (pseudo code) of a CG-target marking module according to the exemplary embodiment of the present invention.

FIG. 9 conceptually shows an algorism (pseudo code) of the processing that is provided by the CG-target marking module 12.

(Main Processing)

First, all flip-flops that exist in the logic circuit model indicated by the internal database 31 are obtained. The obtained flip-flops are stored in a variable [ff]. Then, a loop processing is performed with respect to each flip-flop [ff] (Step A1). In the loop processing, all fan-in cells connected to input pins of each flip-flop [ff] are obtained. The obtained fan-in cells are stored in a variable [cell] (Step A2). Then, a subroutine [trace] is called by using each fan-in cell [cell] as an argument (Step A3). In the subroutine [trace], a "trace processing" is executed in which the processing target is the each fan-in cell [cell].

(Trace Processing)

First, it is judged whether or not the fan-in cell [cell] as the processing target is a selector (Step A4). If the fan-in cell [cell] is not a selector, then the subroutine [trace] is ended, namely, the process exits the trace processing and returns to the source processing that has called the subroutine [trace] (Step A10). On the other hand, if the fan-in cell [cell] is a selector, then a select signal input to the selector of the processing target is analyzed. More specifically, the select signal is traced until a flip-flop or an external port and thereby sources (supply sources) of the select signal are obtained (Step A5). All of the obtained sources of the select signal are stored in a list [end_points_list].

Next, all of the flip-flops and the external ports indicated in the list [end_points_list] are investigated. If there exists at least any one point that is specified as the timing-exception, then the trace processing is ended (Step A6). That is, if at least any one of the sources of the select signal is specified as the timing-exception, the current selector [cell] is not set as the target selector and the subroutine [trace] exits.

On the other hand, if none of the sources of the select signal is specified as the timing-exception, the current selector [cell] is marked as the target selector (Step A7). Moreover, when the current selector [cell] has an input terminal to which a signal other than the select signal is input, all fan-in cells connected to such input terminals are obtained. The obtained fan-in cells are stored in a variable [x] (Step A8). Then, the subroutine [trace] is recursively called by using each fan-in cell [x] as an argument. In other words, the above-described trace processing is recursively executed in which the processing target is the fan-in cell [x] of the current selector [cell] (Step A9).

In accordance with the above-explained algorism, the CG-target marking module 12 performs the marking processing with respect to the internal database 31 shown in FIG. 7.

First, the flip-flop FF in FIG. 7 is obtained and stored in the variable [ff] (Step A1). Next, all fan-in cells of the flip-flop FF are obtained. Here, the selector sel1 is the only fan-in cell. Therefore, the selector sel1 is stored in the variable [cell] (Step A2). Then, the trace processing is performed with respect to the selector sel1 (Step A3).

Since the variable [cell] indicates the selector sel1 (Step A4; Yes), the tracing of the select signal en1 input to the selector sel1 is performed. As a result, the external port en1 as the source of the select signal en1 is stored in the list [end_points_list] (Step A5). In the Step A6, the external port en1 is not specified as the timing-exception ("mul"). Therefore, the selector sel1 is marked as the target selector (Step A7).

Next, in the Step A8, all fan-in cells of the selector sel1 except for the select signal en1 are obtained. Here, the flip-flop FF and the selector sel2 are obtained as the fan-in cells and stored in the variable [x] in series. Then, the trace processing is recursively performed with respect to each of the flip-flop FF and the selector sel2 (Step A9).

The subroutine [trace] is first called by using the flip-flop FF as an argument. In this case, since the variable [x] does not indicate a selector (Step A4; No), the process returns to the source processing (Step A10). Next, the subroutine [trace] is called by using the selector sel2 as an argument. In this case, since the variable [x] indicates the selector sel2 (Step A4; Yes), the tracing of the select signal en2 input to the selector sel2 is performed. As a result, the external port en2 as the source of the select signal en2 is stored in the list [end_points_list] (Step A5). In the Step A6, the external port en2 is not specified as the timing-exception ("mul"). Therefore, the selector sel2 is marked as the target selector (Step A7).

Next, in the Step A8, all fan-in cells of the selector sel2 except for the select signal en2 are obtained. Here, the AND gate A1 and the selector sel3 are obtained as the fan-in cells and stored in the variable [x] in series. Then, the trace processing is recursively performed with respect to each of the AND gate A1 and the selector sel3 (Step A9).

The subroutine [trace] is first called by using the AND gate A1 as an argument. In this case, since the variable [x] does not indicate a selector (Step A4; No), the process returns to the source processing (Step A10). Next, the subroutine [trace] is called by using the selector sel3 as an argument. In this case, since the variable [x] indicates the selector sel3 (Step A4; Yes), the tracing of the select signal en3 input to the selector sel3 is performed. As a result, the external port en3 as the source of the select signal en3 is stored in the list [end_points_list] (Step A5). In the Step A6, the external port en3 is not specified as the timing-exception ("mul"). Therefore, the selector sel3 is marked as the target selector (Step A7).

Next, in the Step A8, all fan-in cells of the selector sel3 except for the select signal en3 are obtained. Here, the flip-flop FF and the selector sel4 are obtained as the fan-in cells and stored in the variable [x] in series. Then, the trace processing is recursively performed with respect to each of the flip-flop FF and the selector sel4 (Step A9).

The subroutine [trace] is first called by using the flip-flop FF as an argument. In this case, since the variable [x] does not indicate a selector (Step A4; No), the process returns to the source processing (Step A10). Next, the subroutine [trace] is called by using the selector sel4 as an argument. In this case, since the variable [x] indicates the selector sel4 (Step A4; Yes), the tracing of the select signal en4 input to the selector sel4 is performed. As a result, the external ports "mul" and "a" as the sources of the select signal en4 are stored in the list [end_points_list] (Step A5). In this case, the list [end_points_list] includes the port "mul" which is specified as the timing-exception. Therefore, the selector sel4 is not marked as the target selector, and the subroutine [trace] exits (Step A6).

Figure 10:
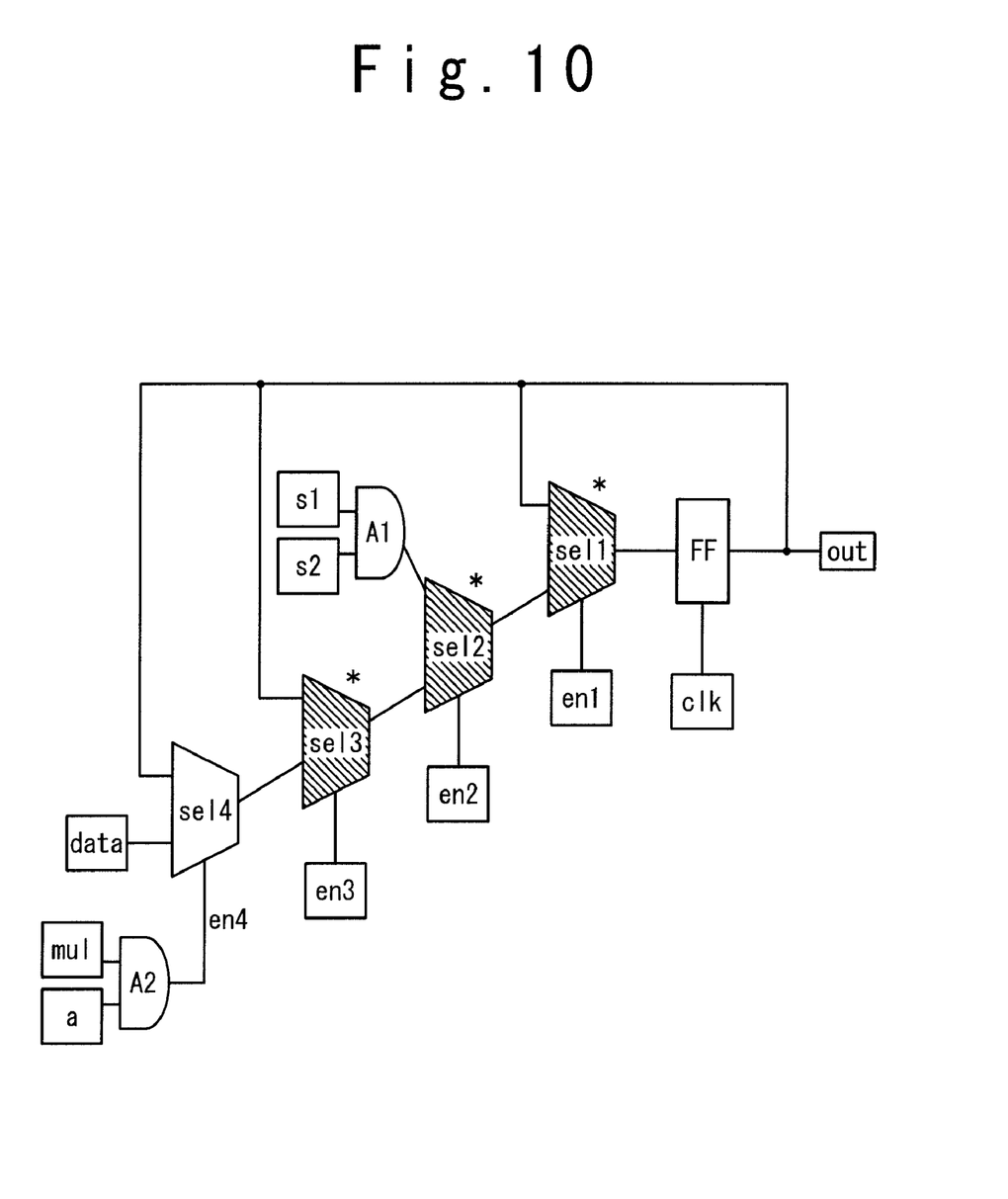
FIG. 10 is a conceptual diagram showing a marked internal database in a case where a marking processing is executed with respect to the internal database shown in FIG. 7.

FIG. 10 shows the marked internal database 32 obtained as a result of the above-explained marking processing. In FIG. 10, a symbol "*" is given to each of the marked target selectors (sel1, sel2 and sel3). In this manner, the target selector can be set by pursuing selectors from the flip-flop FF toward input-side and judging whether or not the select signal includes the timing exception signal.

3-3. Step S3

The clock gating module 13 refers to the marked internal database 32 and automatically inserts the gating cell GC. As a result, the clock-gated internal database 33 as shown in FIG. 11 is generated.

Figure 11:
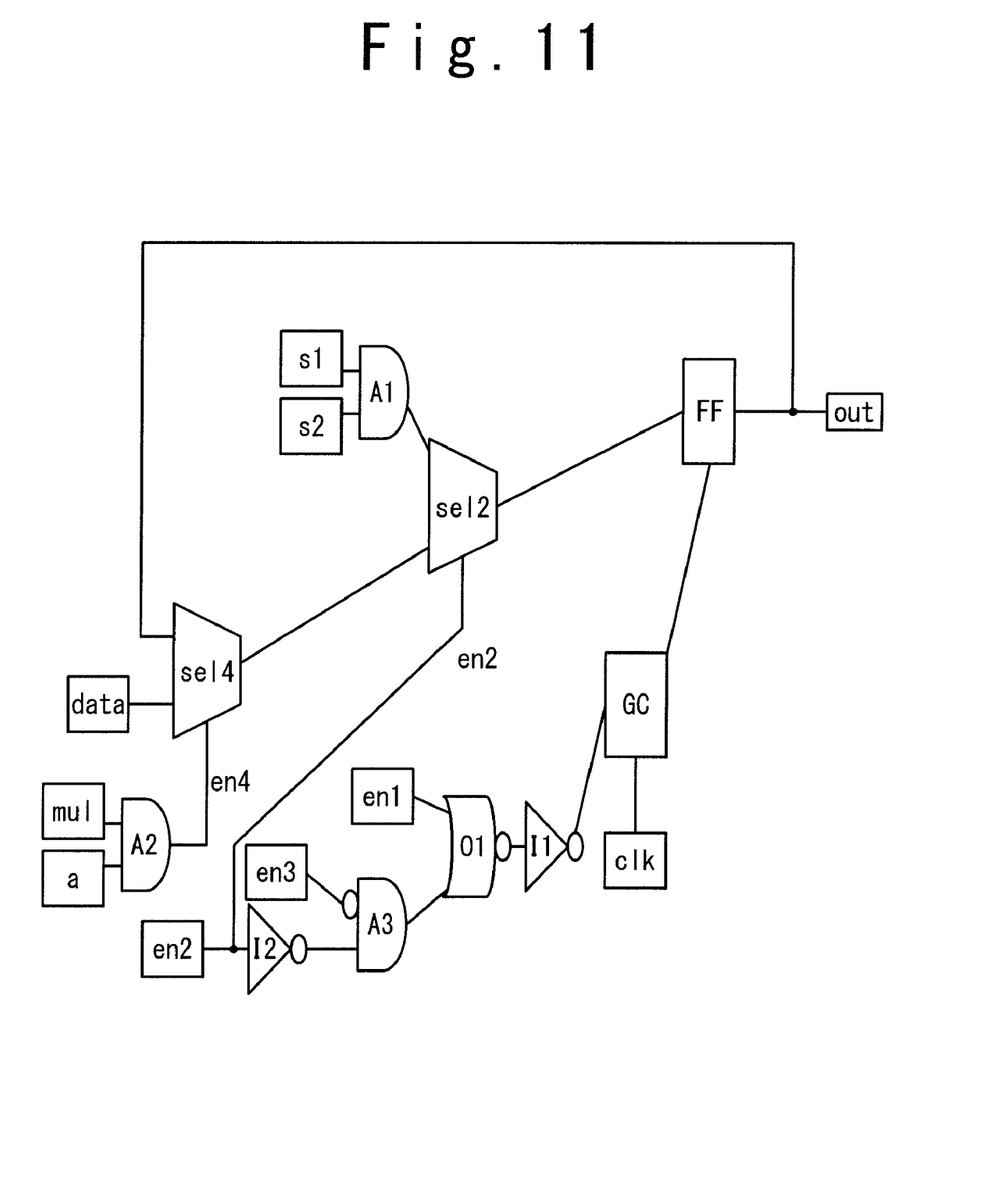
FIG. 11 is a conceptual diagram showing a clock-gated internal database in a case where a gating cell is inserted into the marked internal database shown in FIG. 10.

In FIG. 11, the gating cell GC is provided between the output of the enable logic and the flip-flop FF. The enable signal and the clock signal clk are input to the gating cell GC. The enable logic consists of inverters I1, I2, an AND gate A3, a NOR gate O1, input ports en1, en2 and en3, and does not depend on the timing exception signal "mul". That is, the enable signal is generated from only the select signals en1, en2 and en3 which are input to the target selectors, and does not depend on the select signal en4. In this manner, the gating cell GC is provided separately from the timing exception path according to the exemplary embodiment.

3-4. Step S4

Figure 12:
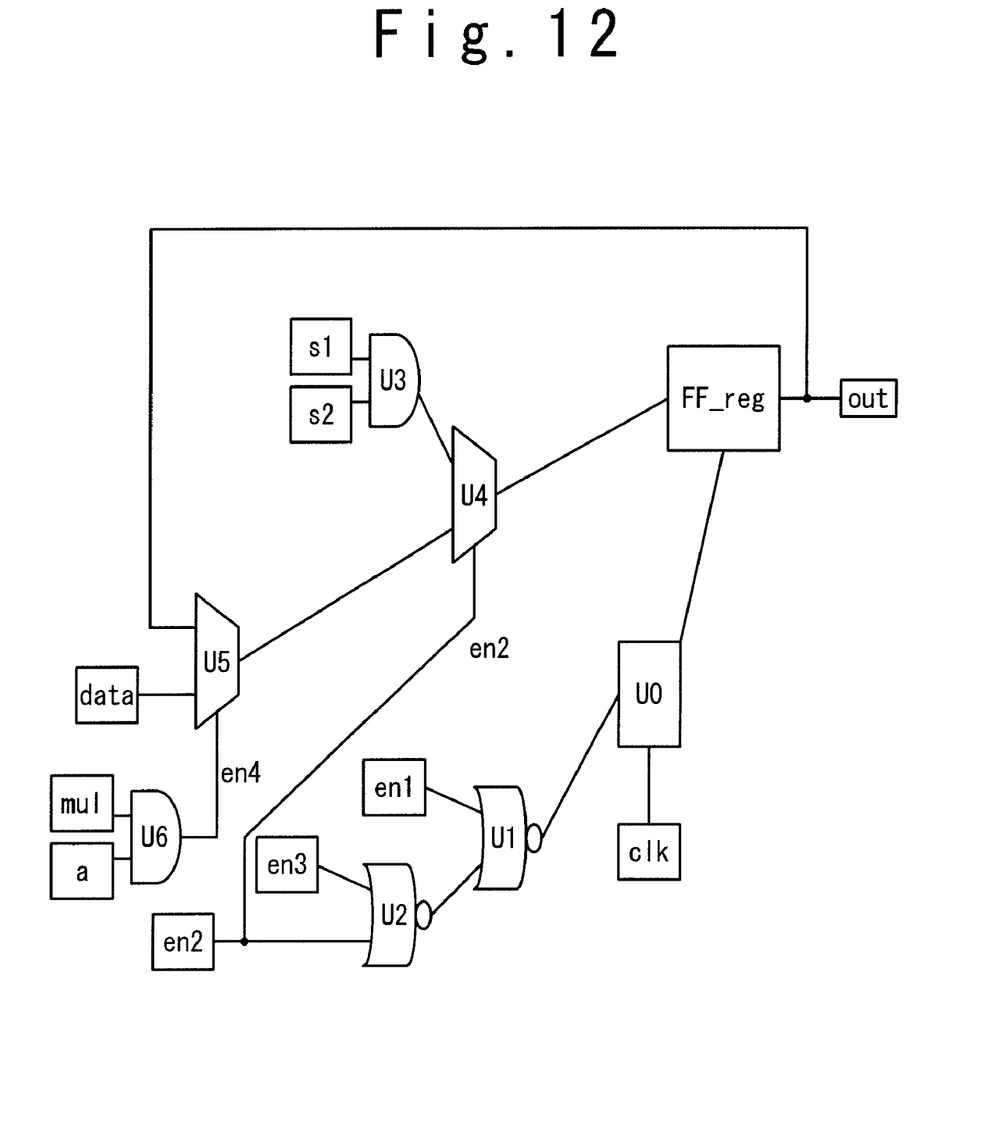
FIG. 12 is a conceptual diagram showing a netlist that is obtained by optimizing the clock-gated internal database shown in FIG. 11.

The logic optimization module 14 optimizes the logic circuit model indicated by the clock-gated internal database 33 under the various constraints (the timing constraint, the timing-exception constraint, the area constraint, the design rule constraint and the like) indicated by the constraint data 23. As the result, the netlist 40 indicating the circuit configuration corresponding to the RTL description is generated. FIG. 12 conceptually shows one example of the generated netlist 40. In FIG. 12, instance names (U0, U1, U2, U3, U4, U5 and U6) are given to the respective logic elements.

4. Effect

According to the exemplary embodiments, as described above, the gating cell GC is provided not to be connected to the timing exception path in the logic synthesis. Therefore, it is not necessary to give the timing exception constraint for the gating cell GC. It is just enough to give the timing exception constraint only for a register and a flip-flop. Thus, the complicated operation of giving the timing exception constraint for the gating cell GC can be omitted. As a result, the efficiency of circuit designing is improved, and thus the time required for designing the semiconductor integrated circuit is reduced.

It will be obvious to one skilled in the art that the present invention may be practiced in other exemplary embodiments that depart from the above-described specific details. The scope of the present invention, therefore, should be determined by the following claims.

What is claimed is:

1. A method of designing a semiconductor integrated circuit, performed by a computer, comprising:

reading, by using the computer, an RTL data indicating RTL description of said semiconductor integrated circuit; and providing, by using the computer, a gating cell for clock gating at least one target element of said semiconductor integrated circuit during logic synthesis of said RTL description, wherein said gating cell includes a latch circuit that latches an enable signal, which activates the at least one target element, in synchronization with a clock signal, wherein said gating cell is not provided in a timing exception path containing a design target circuit which needs not meet design timing constraints of the semiconductor design, wherein said providing a gating cell comprises:

analyzing said RTL description to generate a logic circuit that is logically equivalent to said RTL description, wherein said logic circuit includes a flip-flop as said target element and a selector;

reading a timing-exception specification data that specifies timing-exception;
analyzing a select signal input to said selector and, if said select signal is independent of said timing-exception, identifying said selector as a target selector; and
providing said gating cell such that said enable signal is generated from only said select signal input to said target selector.

2. The method according to claim 1,
wherein said analyzing a select signal input to said selector comprises executing a trace processing in a fan-in cell of said flip-flop,
wherein said trace processing comprises:
if said fan-in cell is not a selector, then exiting said trace processing;
if said fan-in cell is a selector, then tracing a select signal input to said selector and identifying sources of said select signal;
if any one of said sources is specified as said timing-exception, then exiting said trace processing; and
if none of said sources is specified as said timing-exception, then identifying said selector as said target selector.

3. The method according to claim 2,
wherein said selector has an input terminal for receiving an input signal other than said select signal,
wherein said trace processing further comprises: recursively executing said trace processing with respect to a fan-in cell connected to said input terminal of said selector.

4. A design program recorded on a computer-readable medium that, when executed, causes a computer to perform a method comprising:
reading an RTL data indicating RTL description of a semiconductor integrated circuit; and
providing a gating cell for clock gating at least one target element of said semiconductor integrated circuit during logic synthesis of said RTL description,
wherein said gating cell includes a latch circuit that latches an enable signal, which activates the at least one target element, in synchronization with a clock signal,
wherein said gating cell is not provide to a path if the path includes a timing exception path containing a design target circuit which need not meet design timing constraints,
wherein said providing a gating cell comprises:
analyzing said RTL description to generate a logic circuit that is logically equivalent to said RTL description, wherein said logic circuit includes a flip-flop as said target element and a selector;
reading a timing-exception specification data that specifies timing-exception;
analyzing a select signal input to said selector and, if said select signal is independent of said timing-exception, identifying said selector as a target selector; and
providing said gating cell such that said enable signal is generated from only said select signal input to said target selector.

5. The design program according to claim 4,
wherein said analyzing a select signal input to said selector comprises executing a trace processing in a fan-in cell of said flip-flop,
wherein said trace processing comprises:
if said fan-in cell is not a selector, then exiting said trace processing;
if said fan-in cell is a selector, then tracing a select signal input to said selector and identifying sources of said select signal;
if any one of said sources is specified as said timing-exception, then exiting said trace processing; and
if none of said sources is specified as said timing-exception, then identifying said selector as said target selector.

6. The design program according to claim 5,
wherein said selector has an input terminal for receiving an input signal other than said select signal,
wherein said trace processing further comprises: recursively executing said trace processing with respect to a fan-in cell connected to said input terminal of said selector.

7. A system for designing a semiconductor integrated circuit comprising:
a memory device in which an RTL data indicating RTL description of said semiconductor integrated circuit is stored; and
a data processor configured to read said RTL data from said memory device and to perform logic synthesis of said RTL description,
wherein in said logic synthesis, said data processor adds a gating cell for clock gating that includes a latch circuit to which an enable signal and a clock signal are input,
wherein said data processor does not add said gating cell to a path if the path includes a timing exception path containing a design target circuit which need not meet design timing constraints,
wherein said data processor analyzes said RTL description to generate a logic circuit that is logically equivalent to said RTL description, wherein said logic circuit includes a flip-flop as said target element and a selector,
wherein said data processor reads a timing-exception specification data that specifies timing-exception,
wherein said data processor analyzes a select signal input to said selector and, if said select signal is independent of said timing-exception, said data processor identifies said selector as a target selector; and
wherein said data processor provides said gating cell such that said enable signal is generated from only said select signal input to said target selector.

\* \* \* \* \*